US007908023B2

(12) United States Patent
Crawford et al.

(10) Patent No.: US 7,908,023 B2
(45) Date of Patent: Mar. 15, 2011

(54) METHOD OF ESTABLISHING A LOT GRADE SYSTEM FOR PRODUCT LOTS IN A SEMICONDUCTOR MANUFACTURING PROCESS

(75) Inventors: Edward J. Crawford, Hopewell Junction, NY (US); Yunsheng Song, Poughkeepsie, NY (US); Tso-Hui Ting, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/013,642

(22) Filed: Jan. 14, 2008

(65) Prior Publication Data
US 2009/0182447 A1    Jul. 16, 2009

(51) Int. Cl.
*G06F 19/00* (2006.01)
*G01B 3/44* (2006.01)
*G01B 5/28* (2006.01)
*G01N 7/00* (2006.01)
*G01L 1/00* (2006.01)

(52) U.S. Cl. ......... 700/108; 73/31.06; 73/777; 700/95; 700/97; 700/100; 700/105; 700/121; 702/34; 702/35

(58) Field of Classification Search .......... 700/95, 700/108, 121, 97, 100, 105; 716/4, 19; 73/31.06, 73/777, 31.05; 702/34, 35
See application file for complete search history.

(56) References Cited

U.S. PATENT DOCUMENTS

| | | | | |
|---|---|---|---|---|
| 4,646,238 A * | 2/1987 | Carlson et al. | | 700/95 |
| 5,726,074 A * | 3/1998 | Yabe | | 438/10 |
| 5,822,208 A * | 10/1998 | Bory | | 700/108 |
| 5,838,951 A * | 11/1998 | Song | | 716/19 |
| 5,856,923 A * | 1/1999 | Jones et al. | | 700/121 |
| 5,933,350 A * | 8/1999 | Fujimoto et al. | | 700/121 |
| 5,971,586 A * | 10/1999 | Mori | | 700/108 |
| 6,293,139 B1 * | 9/2001 | Keller et al. | | 73/105 |
| 6,701,201 B2 * | 3/2004 | Hegde et al. | | 700/107 |
| 6,748,287 B1 * | 6/2004 | Hagen et al. | | 700/99 |
| 6,799,311 B1 * | 9/2004 | Ryskoski | | 716/19 |
| 6,862,725 B2 * | 3/2005 | Takagi et al. | | 716/19 |
| 6,978,187 B1 * | 12/2005 | Ryskoski | | 700/100 |
| 7,062,346 B2 * | 6/2006 | Takagi et al. | | 700/116 |
| 7,218,984 B1 * | 5/2007 | Bayat et al. | | 700/121 |
| 7,610,111 B2 * | 10/2009 | Lin et al. | | 700/101 |
| 2001/0047953 A1 * | 12/2001 | Capser | | 209/573 |

OTHER PUBLICATIONS

Dorit et al., Scheduling Semiconductor Burn-in Operations to Minimize Total Flowtime, 1995, University of California Berkeley, pp. 874-885.*

* cited by examiner

*Primary Examiner* — Albert Decady
*Assistant Examiner* — Tom Stevens
(74) *Attorney, Agent, or Firm* — Cantor Colburn LLP; Yuanmin Cai

(57) ABSTRACT

A method of establishing a lot grading system for lots in a semiconductor manufacturing process includes defining a new lot grade for at least one lot in the semiconductor manufacturing process. The at least one lot is has a current lot grade and the new lot grade is dependent upon the current lot grade. The new lot grade is saved in a grading referenced database and the at least one lot in the semiconductor manufacturing process is updated with the new lot grade.

19 Claims, 9 Drawing Sheets

METHOD OF ESTABLISHING A LOT GRADE SYSTEM FOR PRODUCT LOTS IN A SEMICONDUCTOR MANUFACTURING PROCESS

BACKGROUND OF THE INVENTION

1. Field of the Invention

This invention relates to the art of manufacturing and, more particularly, to a method of establishing a lot grade system for lots in semiconductor device manufacturing process.

2. Description of Background

Semiconductor wafer fabrication includes a series of carefully designed process steps running on sophisticated capital equipment. The demand for more product functionality drives a need for more complicated production line processes. As production processes grow more complex, the need to monitor production quality increases. Work-in-process or WIP management employs a lot grading system to monitor lots of semiconductor wafers passing through a production process to ensure high yield and high quality. Lot grading is a method of monitoring process changes in a sequential order to evaluate potentially incrementally higher yield output. Conventionally, for each major process change, a new lot grade(s) would be updated manually. Defining a new lot grade may involve single, multiple, front-end-of-the-line FEOL or back-end-of-the-line BEOL process changes. In conventional lot grading methods, defining a new lot grade for a BEOL process change, of which a WIP may contain multiple lot grades, usually did not accommodate FEOL upgrading, or vice-versa. Given the large number of lots, often times greater than 100, in a semiconductor production line at any given time, manual lot grading is very time-consuming and often times unreliable for quality and yield tracking purposes.

SUMMARY OF THE INVENTION

The shortcomings of the prior art are overcome and additional advantages are provided through the provision of a method of establishing a lot grading system for lots in a semiconductor manufacturing process. The method includes defining a new lot grade for at least one lot in the semiconductor manufacturing process. The at least one lot is has a current lot grade and the new lot grade is dependent upon the current lot grade. The new lot grade is saved in a grading referenced database and the at least one lot in the semiconductor manufacturing process is updated with the new lot grade.

In accordance with another aspect of the invention, a computer program product includes a computer useable medium having a computer readable program, wherein the computer readable program when executed on a computer causes the computer to save a lot grade definition in a grading reference database. The program further causes the computer to generate a lot grade based on the lot grade for at least one lot, load the lot grade into the grading reference database, and update the lot grade for the at least one lot in the manufacturing process.

In accordance with yet another exemplary embodiment of the present invention, a system for establishing a lot grading system includes a central processing unit (CPU), an input/output (I/O) adapter for a connecting at least one of a removable data storage device, a program storage device, and a mass data storage device, a user interface adapter for connecting a keyboard and a mouse and a display adapter for connecting a display device. The system also includes at least one memory device thereupon stored a set of instructions which, when executed by said CPU, causes said system to define a new lot grade for at least one lot in the semiconductor manufacturing process. The at least one lot has a current lot grade and the new lot grade is dependent upon the current lot grade. The set of instruction also causes the system to save the new lot grade in a grading reference database, and update the at least one lot in the semiconductor manufacturing process with the new lot grade.

Additional features and advantages are realized through the techniques of exemplary embodiments of the present invention. Other embodiments and aspects of the invention are described in detail herein and are considered a part of the claimed invention. For a better understanding of the invention with advantages and features, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
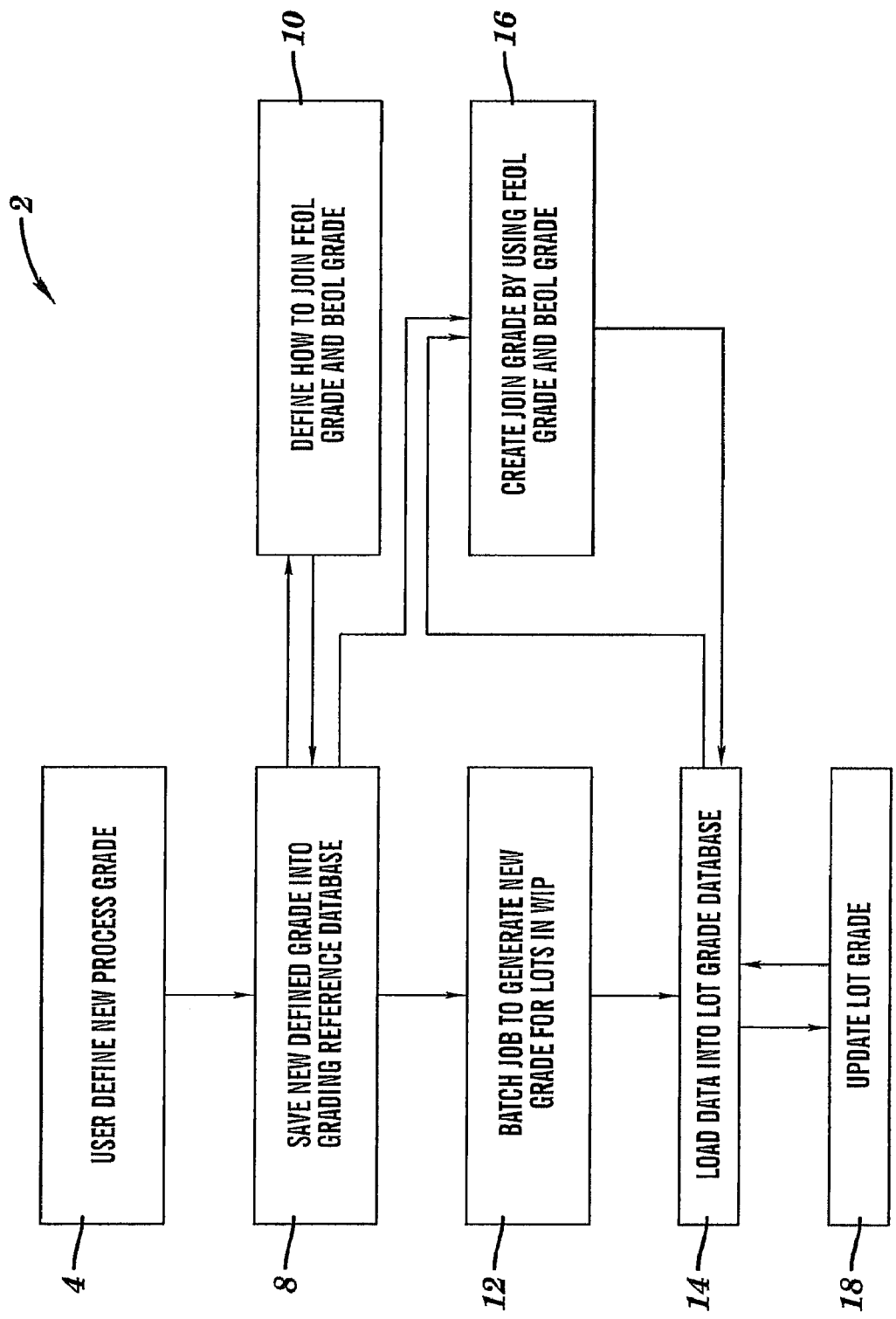
FIG. 1 is a flow diagram illustrating one example of an overall lot grading system for at least one lot in a semiconductor manufacturing process.

With initial reference to FIG. 1 a method of establishing an automated lot grade system for lots in semiconductor device manufacturing process is indicated generally at 2. Each lot in the semiconductor manufacturing process has a current lot grade that is selectively updated with a new lot grade by method 2. The current lot grade describes a particular of quality or yield associated with a particular group of lots while a new lot grade represents that a new process change or new multiple process changes are applied to some or all of the lots in the current lot grade. Towards that end, prior to some or all of the lots in the current lot grade arriving at a new process change, a user defines a new lot grade such as indicated in block 4. The new lot grade is then saved in a grading reference database as indicated in block 8. If the lot grade relates to a front end-of-the line (FEOL) portion and/or back end-of-the-line (BEOL) portion of the manufacturing process, the manner in which the FEOL and BEOL grades are joined is defined, as indicated in block 10. The joined grade definition is passed back to, and saved in, the grading reference database in block 8. Most specifically, often various products, such as semi-conductor, require different FEOL processes each having a particular lot grade. The products passing from the different FEOL processes merge with, or join, a single BEOL process having an associated lot grade. Thus, the exemplary method 2 defines how lot grades from distinct FEOL processes are merged with, or join, a single BEOL process in order to monitor lot grades for an entire production process. In any event, once the new or joined grade definition is defined in the grading reference database, a batch job is created to generate the new grade for lots in the manufacturing process, such as indicated in block 12. Data associated with the new lot grade is loaded into a lot grade database as indicated in block 14. If different FEOL and BEOL process are employed, a joined lot grade is established by using FEOL grade and BEOL grade definitions as indicated in block 16. The joined lot grade is then passed back into, and saved in, the lot grade database in block 14. Once the lot grade has been established in the lot grade database in block 14, the lot grade for the production process can be upgraded as indicated in block 18.

Figure 2:
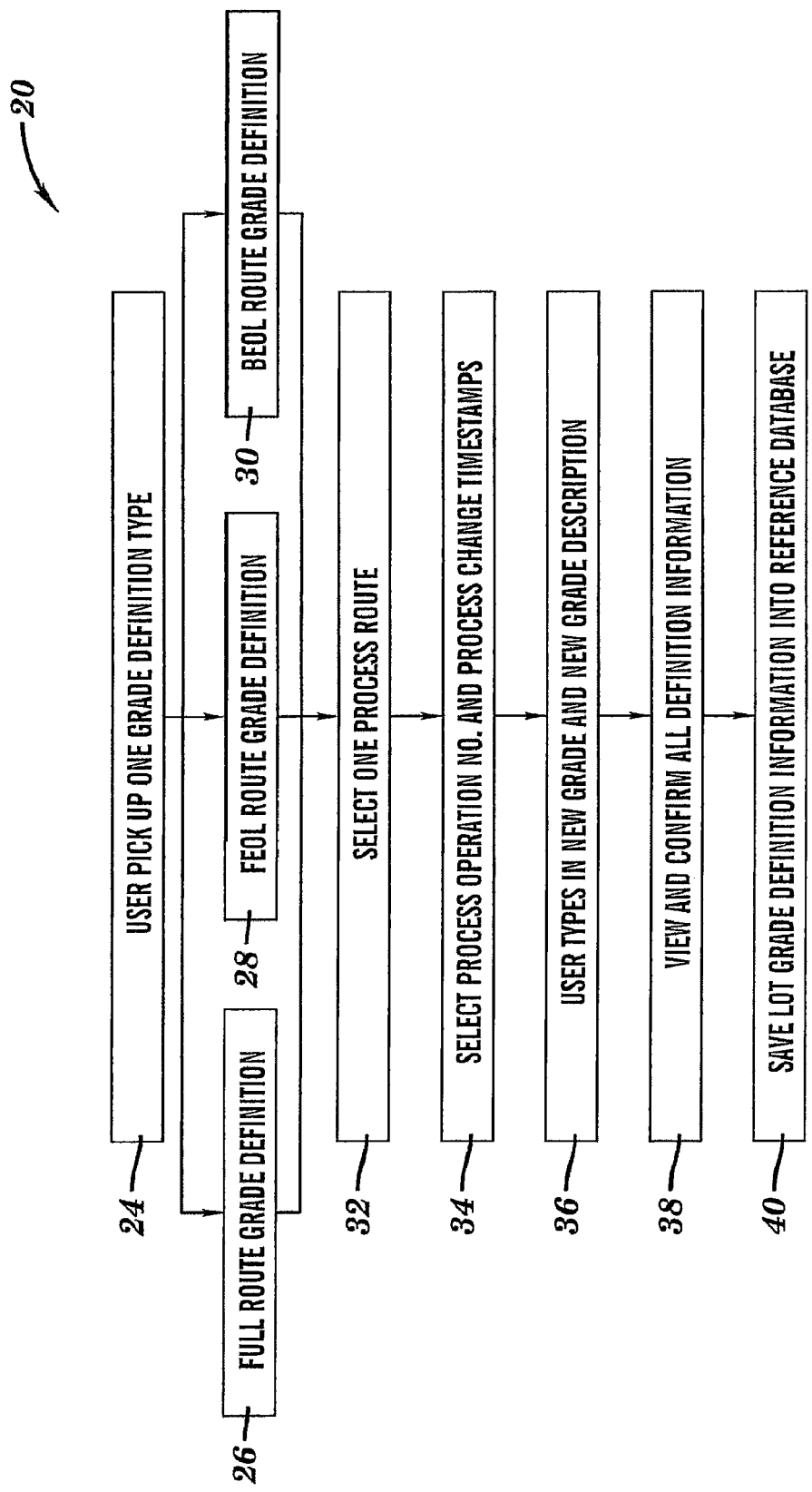
FIG. 2 is a flow diagram illustrating one example of a method of defining a lot grade in the manufacturing process.

Reference is now made to FIG. 2 in describing a method 20 of defining a new lot grade for block 4. In order to define a new lot grade, a user first picks one grade definition type in block 24. More specifically, the user selects only one of three grade definition options, namely, a full route grade definition in block 26, with the full route grade definition being applied to an entire production line, a FEOL route grade definition in block 28 which is applied to an FEOL portion of the production process or a BEOL route grade definition in block 30 which applies only to a BEOL portion of the process. Once the grade definition is chosen, a single process route is selected in block 32. At this point, process operation numbers and process change timestamps are selected in block 34. Once process operation numbers and process change timestamps are selected, the user inputs a new grade and new grade description in block 36. After the new grade and new grade description are input in block 36, all definition information is confirmed in block 38 and the lot grade definition information is saved into a grade definition reference database in block 40. It should be understood, that by utilizing process operation numbers and process change time stamps, the new lot grade is dependent upon a current lot grade for work-in-process or WIP lots.

Figure 3:
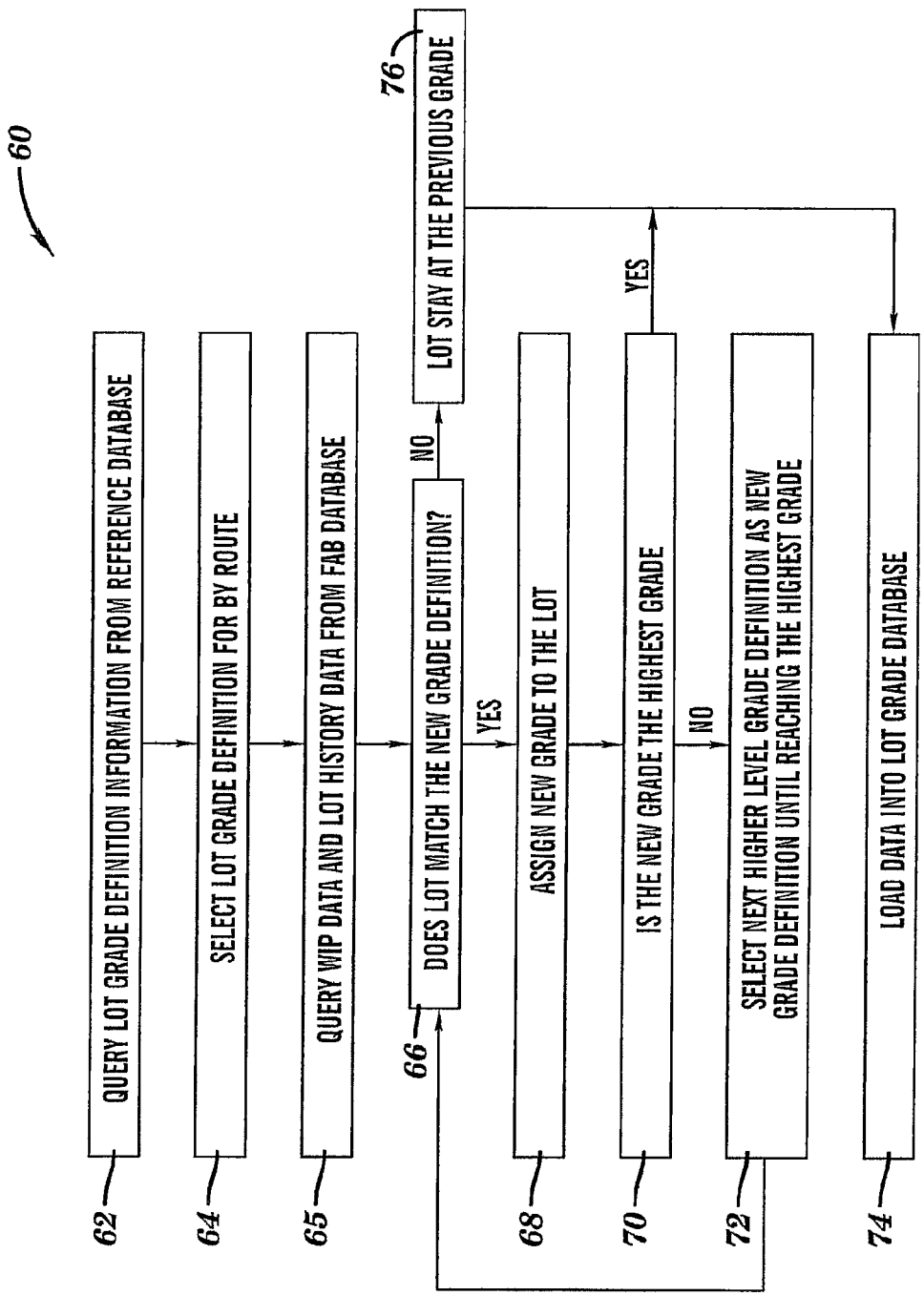
FIG. 3 is a flow diagram illustrating one example of assigning a new lot grade for at least one lot in the manufacturing process through the use of lot grade definition information obtained from the method of FIG. 2.

Reference will now be made to FIG. 3 in describing a method 60 of creating a batch job to generate new grades for lots in the production line. Initially, lot grade information is pulled from the grade definition reference database in block 62. At this point, a lot grade definition is selected for a particular route in block 64. Once the lot grade definition is selected, WIP data and lot history data is cross-referenced from a fabrication database in block 65. Next, a determination is made as to whether the particular lot matches the new grade definition in block 66. If the lot does match the new grade definition, a new lot grade is assigned to the lot in block 68. After the lot grade is assigned, a determination is made as to whether the new grade is the highest grade possible for the particular lot in block 70. If the lot grade is not the highest possible grade, a new higher grade level definition is selected as the new grade definition. This process repeats until the highest lot grade is reached, in block 72. If the new grade assigned in block 68 is the highest grade determined in block 70, lot grade data is loaded into lot grade database as indicated in block 74. If, on the other hand, the lot does not match the new grade definition in block 66, the lot will stay at the previous grade in block 76 and the lot grade database is updated to reflect no change in block 76.

Figure 4:
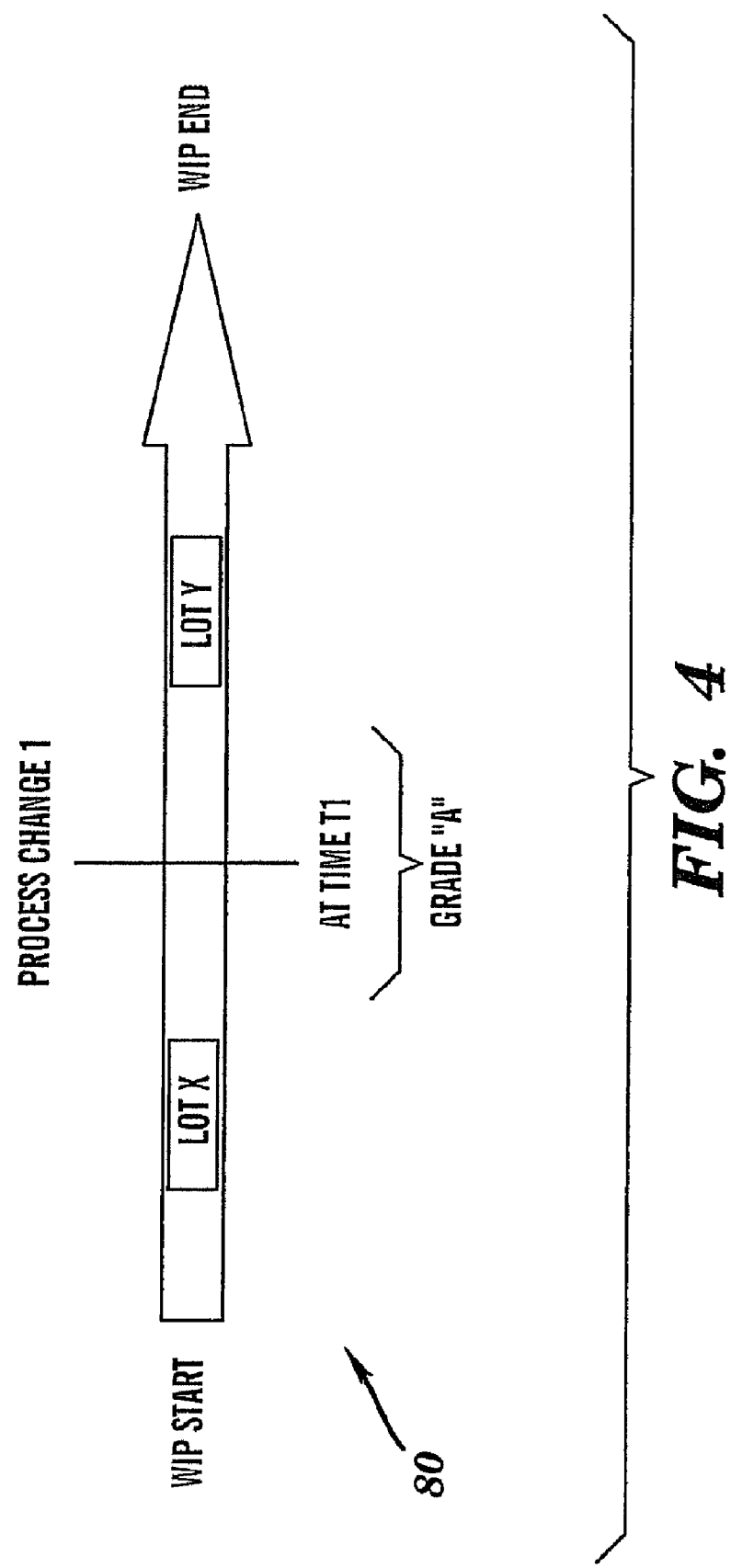
FIG. 4 illustrates an algorithm employed to create a lot grade for a single process change using lot grade definition information obtained from the method of FIG. 2.

Reference will now be made to FIG. 4 in describing an algorithm 80 employed to predict a new lot grade for a single process change using lot grade definition information from the lot grade definition database. A lot "X" having an initial or current lot grade (not labeled) undergoes a process change at timestamp or T1. Lot X is assigned new lot grade "A" by default as lot X will have a timestamp for the process change greater than T1. If the timestamp for lot "Y" is later than T1, lot "Y" is assigned new lot grade "A", otherwise lot "Y" will remain at a previously designated lot grade, given that lot "Y" was processed before the process change. In this manner, algorithm 80 predicts the new lot grade based on at least one of the current lot grade, a work-in-process location of the at least one lot, a work-in-process location of a process change and a time stamp indicating a process change.

Figure 5:
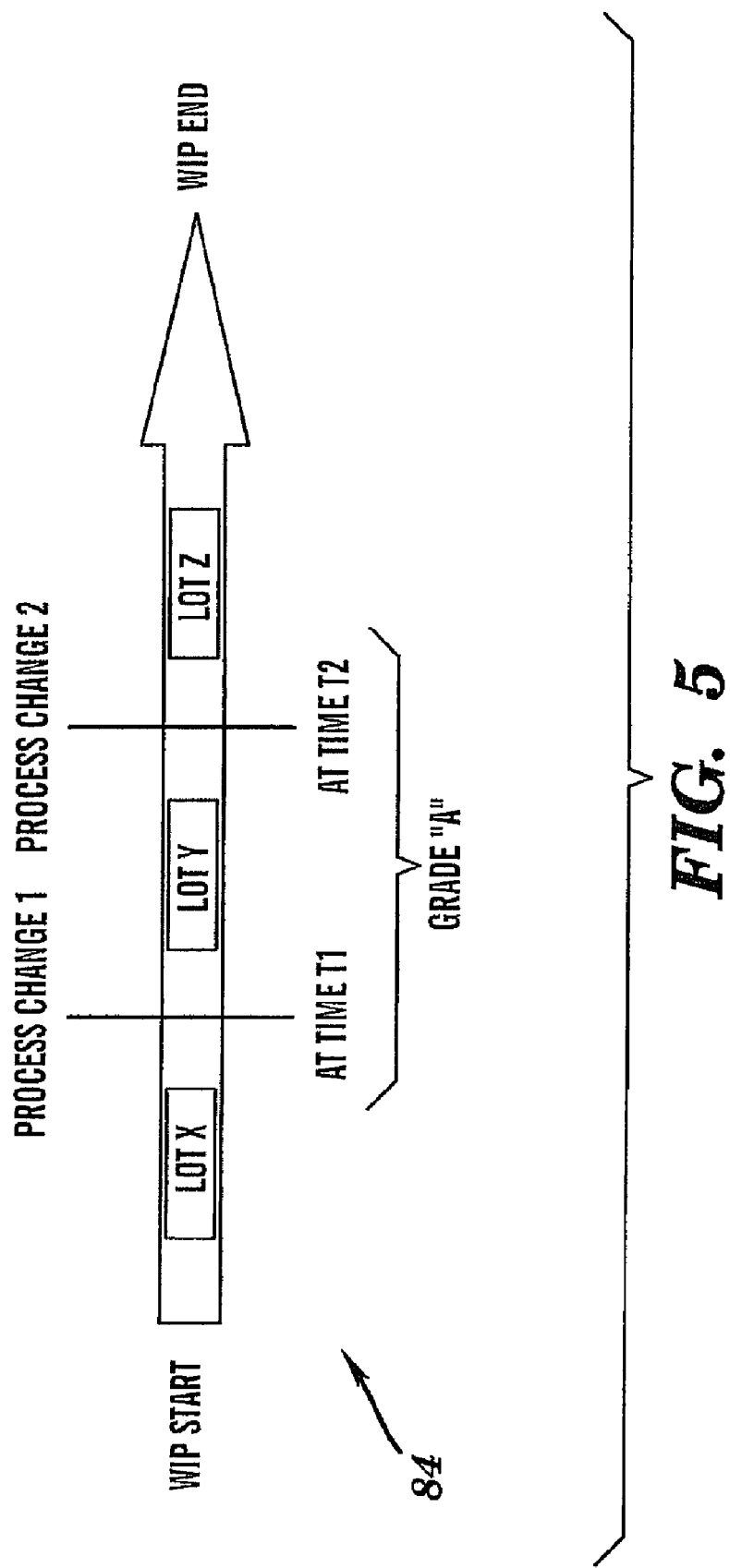
FIG. 5 illustrates an algorithm employed to create a lot grade for a multiple process change using lot grade definition information obtained from the method of FIG. 2.

FIG. 5 illustrates an algorithm 84 employed to predict a new lot grade for a multiple process change using lot grade definition information from the lot grade definition database. As shown, a first process change occurs at timestamp or T1, and a second process change occurs at timestamp or T2. T1 and T2 are combined and assigned a new lot grade "A". Lot X has an initial or current lot grade and is assigned the new lot grade by default as lot X will have a timestamp for the first process change greater than T1 and for the second process change, greater than T2. For lot Y, if the timestamp for the second process change will be greater than T2, so if the timestamp of the first process change is greater than T1, lot Y is assigned new lot grade "A", otherwise, lot Y remains as previously designated. Lot Z will not be assigned new lot grade "A" as lot Z has a timestamp for the first process change that is smaller than T1 or a timestamp for the second process change that is smaller than T2. In this manner, algorithm 84 predicts the new lot grade based on at least one of the current lot grade, a work-in-process location of the at least one lot, a work-in-process location of a process change and a time stamp indicating a process change.

Figure 6:
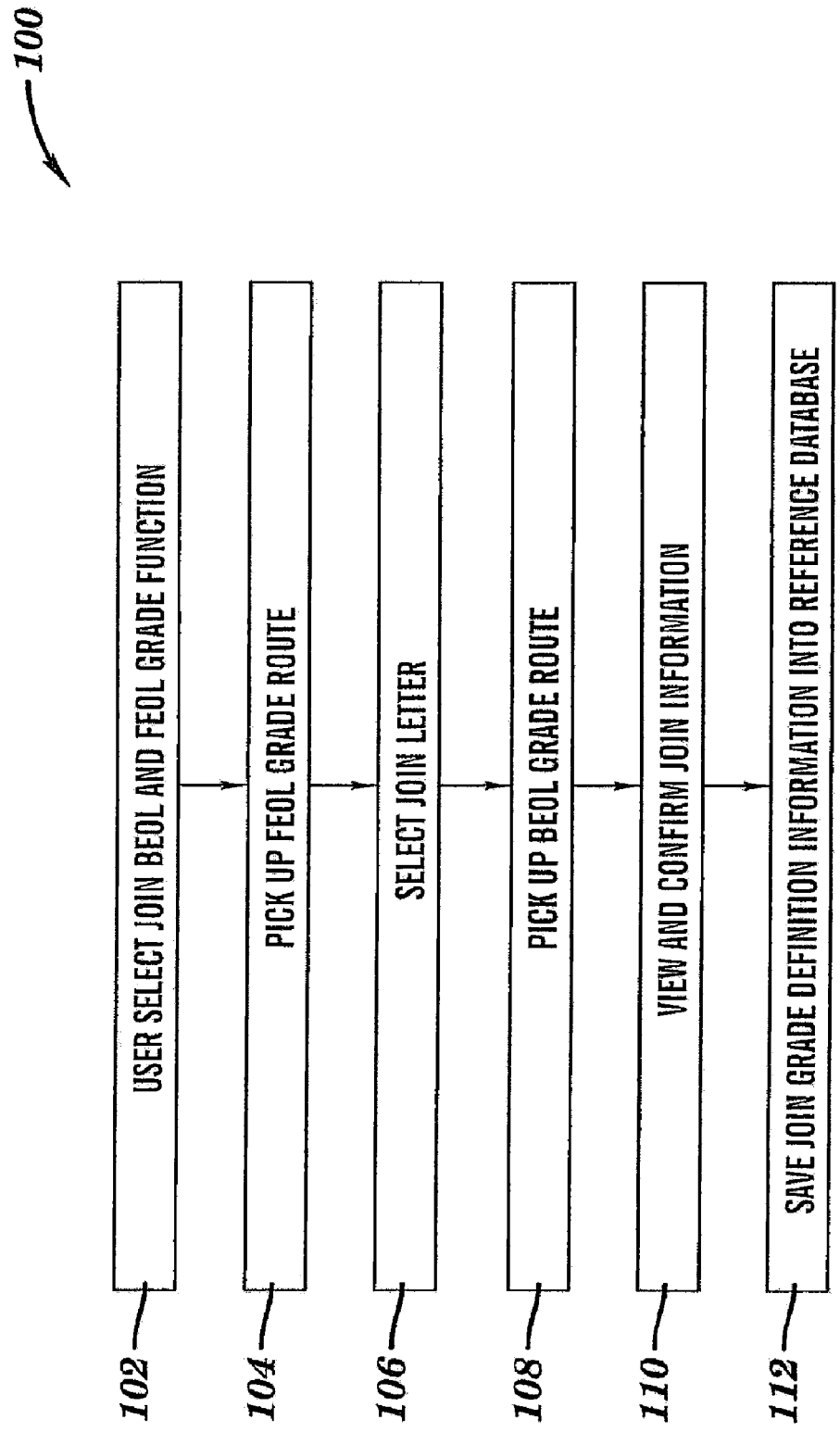
FIG. 6 is a flow diagram illustrating one example of combining lot grades from front-end-of-the-line (FEOL) and back-end-of-the-line (BEOL) processes for at least one lot in the manufacturing process.

Reference will now be made to FIG. 6 in describing a method 100 for joining FEOL and a BEOL grade for block 10. As shown, the user initially selects a join BEOL and FEOL grade function in block 102. A FEOL grade route is chosen in block 104 and a join letter associated with the grade route is selected in block 106. After selecting the join letter, a BEOL grade route is chosen in block 108. The join information is viewed and confirmed in block 110. Once the information is confirmed, the user saves the join grade definition information into the grade definition reference database in block 112.

Figure 7:
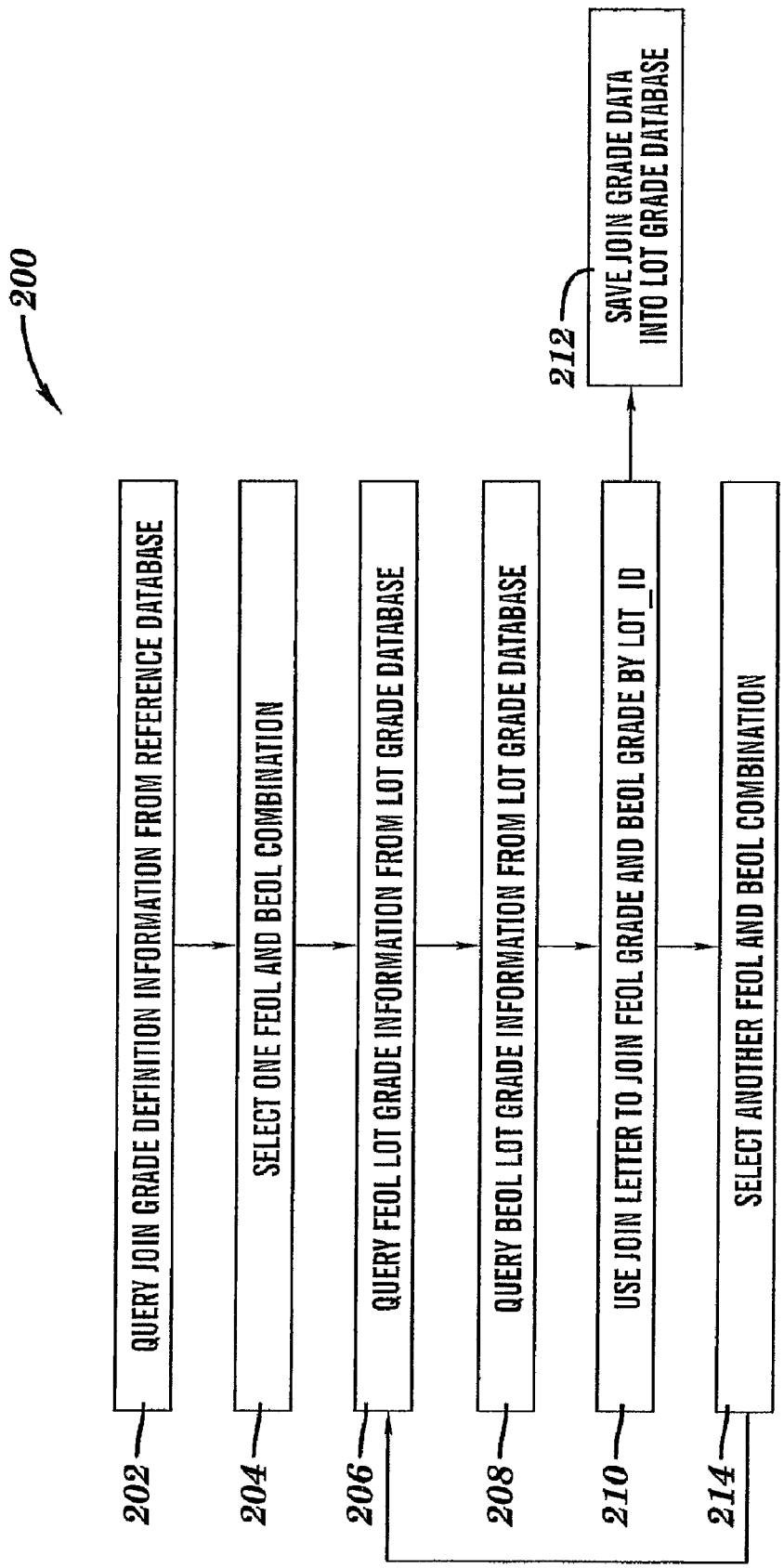
FIG. 7 is a flow diagram illustrating one example of an automated batch job system for assigning a new joined lot grade to lots in the manufacturing process by using join grade data obtained from the method of FIG. 6.

FIG. 7 illustrates a method 200 of creating a join grade through the use of a FEOL grade and a BEOL grade. To create the join grade, join grade definition information is pulled from the grade definition reference database in block 202. At this point, the system selects one FEOL and BEOL combination from the reference database in block 204. FEOL lot grade information is drawn from the lot grade database in block 206 and BEOL lot grade information is drawn from the lot grade database in block 208. A join letter is employed to join the FEOL grade and BEOL grade to create new lot grades grouped by lots in block 210. If no other FEOL and BEOL combinations are required, the join grade data is saved into the lot grade database in block 212. If, however, additional FEOL and BEOL combinations are present, the next FEOL and BEOL combination is selected in block 214 and the process returns to block 206.

Figure 8:
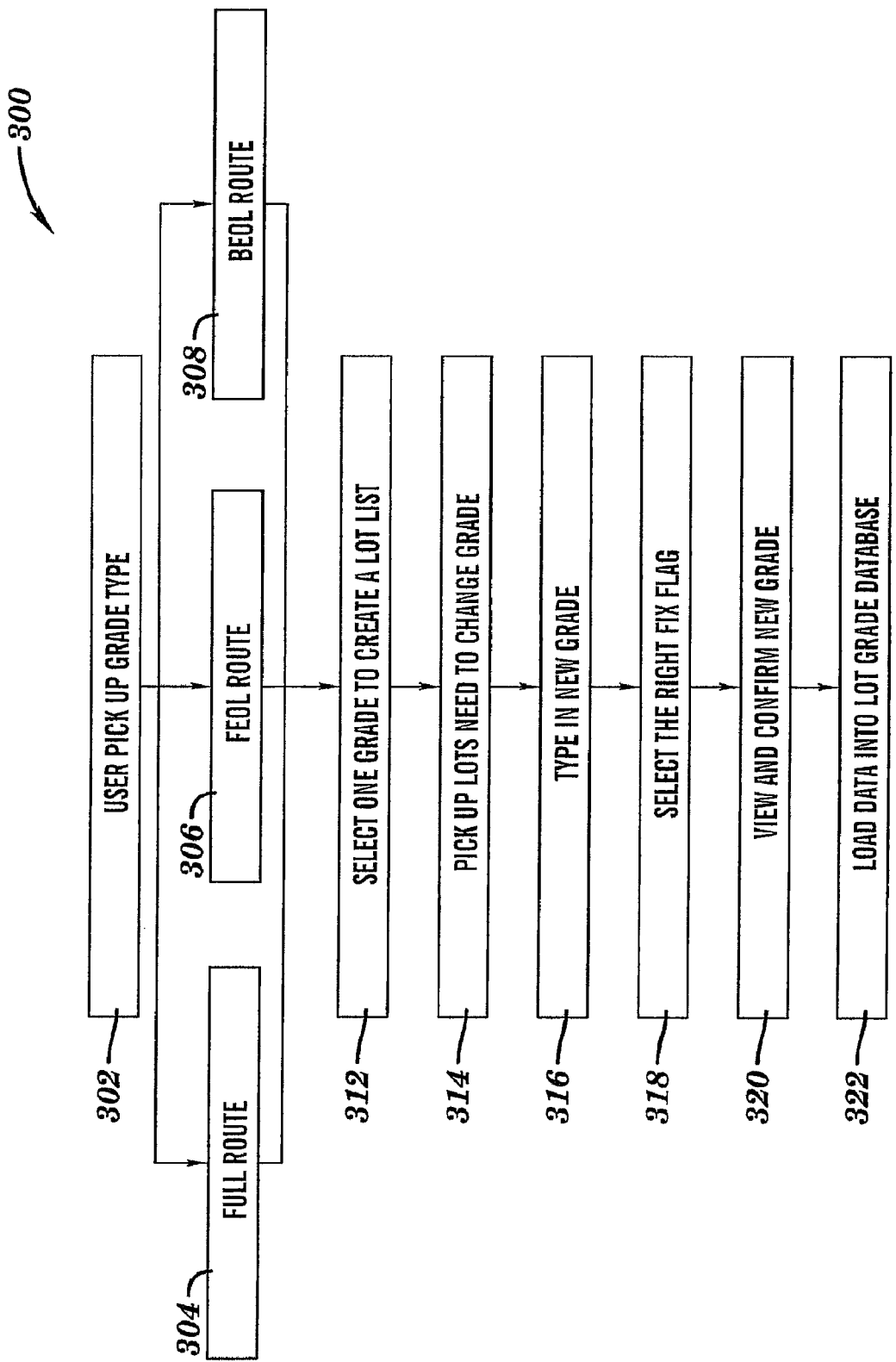
FIG. 8 is a flow diagram illustrating one example of a method of changing a lot grade manually for a particular lot(s) in the manufacturing process.

In FIG. 8, there is illustrated a method 300 of updating a lot grade. After choosing a grade type in block 302, the user selects one of three options, namely, a full route process in block 304, a FEOL route process in block 306, and a BEOL route process in block 308. A lot grade is selected and a lot list is generated in block 312. Next, multiple lots for which a grade change is required are selected in block 314. A new grade is entered in block 316 and a fix flag is established in block 318. For any lot in the semiconductor manufacturing process, a grade status can be set using the "Fix Flag". For example, an "N Flag" indicates that the lot grade will change to a higher grade automatically; a "Y Flag" indicates that the new process lot grade will not be changed. After viewing and confirming the new grade in block 320, the new grade data is loaded into the lot grade database in block 322.

At this point, it should be appreciated that the above described method provides an efficient, cost effective and accurate alternative to manually selecting and upgrading individual lot grades for a semiconductor production process. In this manner, lot grade(s) can be established for larger and more complex production processes required in, for example, modern semi-conductor manufacturing facilities. The lot grades are tracked, evaluated and upgraded, as necessary, to maintain high production quality. In any event, it should be readily understood the capabilities of the present invention can be implemented in software, firmware, hardware or combinations thereof.

Figure 9:
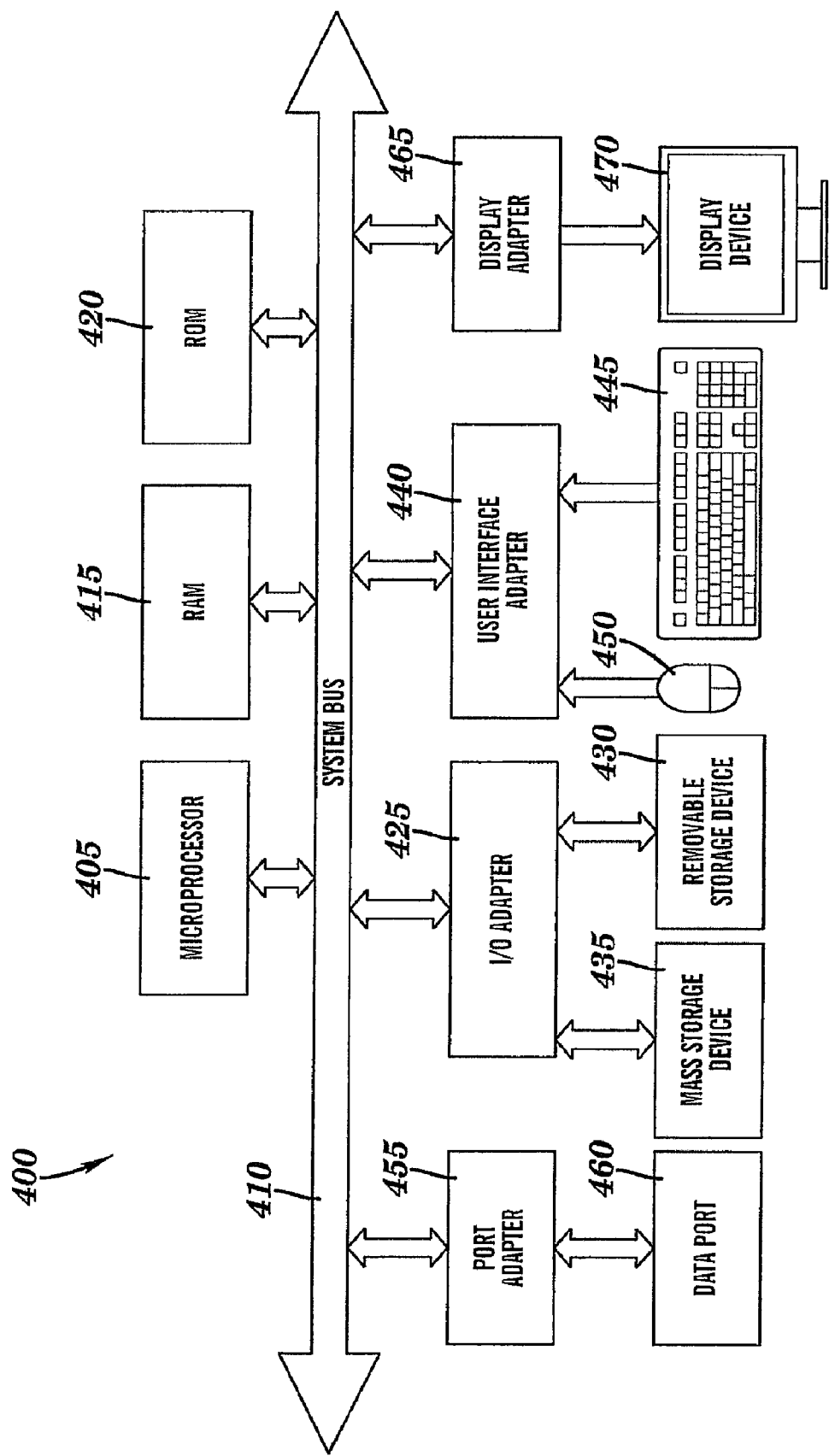
FIG. 9 is a schematic block diagram of a general-purpose computer suitable for practicing the present invention exemplary embodiments.

Generally, the method of establishing an automated lot grade system for lots in semiconductor device manufacturing process described herein is practiced with a general-purpose computer and the method may be coded as a set of instructions on removable or hard media for use by the general-purpose computer. FIG. 9 is a schematic block diagram of a general-purpose computer suitable for practicing the present invention embodiments. In FIG. 9, computer system 400 has at least one microprocessor or central processing unit (CPU) 405. CPU 405 is interconnected functionally, via a system bus 410, to a random access memory (RAM) 415, a read-only memory (ROM) 420, an input/output (I/O) adapter 425 connecting to a removable data and/or program storage device 430 and/or a mass data and/or program storage device 435, a user interface adapter 440 connecting to a keyboard 445 and a mouse 450, a port adapter 455 connecting to a data port 460, and a display adapter 465 connecting to a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

While the preferred embodiment to the invention has been described, it will be understood that those skilled in the art, both now and in the future, may make various improvements and enhancements which fall within the scope of the claims which follow. Furthermore, the flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. These claims should be construed to maintain the proper protection for the invention first described.

The invention claimed is:

1. A method of establishing a lot grading system for lots in a semiconductor manufacturing process, the method comprising:
   defining a new lot grade for at least one lot in the semiconductor manufacturing process, the at least one lot having a current lot grade, the new lot grade being dependent upon the current lot grade of the at least one lot in the semiconductor manufacturing process;
   predicting the new lot grade based on the current lot grade; a work-in-process location of the at least one lot; a work-in-process location of a process change; and a time stamp indicating the process change;
   saving the new lot grade in a grading reference database; and
   updating the at least one lot in the semiconductor manufacturing process with the new lot grade.

2. The method of claim 1, wherein, said defining a new lot grade comprises defining a full route lot grade in the semiconductor manufacturing process.

3. The method of claim 1, wherein said defining a new lot grade comprises defining a front-end-of-the-line (FEOL) lot grade and an back-end-of-the-line (BEOL) lot grade, the FEOL lot grade being associated with at least one FEOL process changes and the BEOL lot grade being associated with one or more BEOL process changes.

4. The method of claim 3, wherein said saving the new lot grade in the grading reference database comprises saving information including a description of how the FEOL lot grade and the BEOL lot grade are joined.

5. The method of claim 4, further comprising: generating the new lot grade by combining the FEOL lot grade and the BEOL lot grade.

6. The method of claim 5, wherein combining the FEOL lot grade and the BEOL lot grade comprises:
   querying a lot list from a lot grade database for the FEOL lot grade;
   querying the lot list from the lot grade database for the BEOL lot grade;
   joining the FEOL lot grade and the BEOL lot grade to create a joined lot grade for at least one lot in the semiconductor manufacturing process; and
   loading the joined lot grade into the lot grade database.

7. The method of claim 1, wherein said defining the new lot grade for at least one lot in the semiconductor manufacturing process comprises automatically defining the new lot grade.

8. The method of claim 1, wherein said updating the at least one lot in the semiconductor manufacturing process with the new lot grade comprises automatically updating the at least one lot with the new lot grade.

9. A computer program product comprising:
a computer useable medium including a computer readable program, wherein the computer readable program when executed on a computer causes the computer to:
define a new lot grade for at least one lot in a semiconductor manufacturing process, the at least one lot having a current lot grade, the new lot grade being dependent upon the current lot grade of the at least one lot in the semiconductor manufacturing process;
predict the new lot grade based on the current lot grade, a work-in-process location of the at least one lot, a work-in-process location of a process change, and a time stamp indicating the process change;
save the new lot grade in a grading reference database; and
update the at least one lot in the semiconductor manufacturing process with the new lot grade.

10. The computer program product according to claim 9, wherein the computer readable program when executed on a computer causes the computer to:
establish a full route lot grade based on the lot grade for the at least one lot in the semiconductor manufacturing process for at least one step of the semiconductor manufacturing process.

11. The computer program product according to claim 9, wherein the computer readable program when executed on a computer causes the computer to:
establish a front-end-of-the-line (FEOL) lot grade and a back-end-of-the-line (BEOL) lot grade based on the current lot grade, the FEOL lot grade being associated with at least one FEOL process changes and the BEOL lot grade being associated with one or more BEOL process changes.

12. The computer program product according to claim 11, wherein the computer readable program when executed on a computer causes the computer to:
combine the FEOL lot grade and the BEOL lot grade based on data stored in the grading reference database.

13. The computer program product according to claim 11, wherein the computer readable program when executed on a computer causes the computer to:
generate a join lot grade, the join lot grade including a combined lot grade of the FEOL lot grade and the BEOL lot grade.

14. The computer program product according to claim 11, wherein the computer readable program when executed on a computer causes the computer to:
query a lot list from a lot grade database for the FEOL lot grade;
query the lot list from the lot grade database for the BEOL lot grade;
join the FEOL lot grade and the BEOL lot grade to form a combined lot grade for the at least one lot in the semiconductor manufacturing process; and
assign the combined lot grade to the at least one lot in the semiconductor manufacturing process.

15. A system for establishing a lot grading system comprising:
a central processing unit (CPU), said CPU being interconnected functionally via a system bus to:
an input/output (I/O) adapter connecting to at least one of a removable data storage device, a program storage device, and a mass data storage device;
a user interface adapter connecting to a keyboard and a mouse;
a display adapter connecting to a display device; and
at least one memory device thereupon stored a set of instructions which, when executed by said CPU, causes said system to:
define a new lot grade for at least one lot in a semiconductor manufacturing process, the at least one lot having a current lot grade, the new lot grade being dependent upon the current lot grade of the at least one lot in the semiconductor manufacturing process;
predict the new lot grade based on the current lot grade, a work-in-process location of the at least one lot, a work-in-process location of a process change, and a time stamp indicating the process change;
save the new lot grade in a grading reference database; and
update the at least one lot in the semiconductor manufacturing process with the new lot grade.

16. The system according to claim 15, wherein the set of instructions, when executed by said CPU, causes said system to:
establish a full route lot grade based on the lot grade for the at least one lot in the semiconductor manufacturing process for one or more steps of the semiconductor manufacturing process.

17. The system according to claim 15, wherein the set of instructions, when executed by said CPU, causes said system to:
establish a front-end-of-the-line (FEOL) lot grade and a back-end-of-the-line (BEOL) lot grade based on the current lot grade, the FEOL lot grade being associated with at least one FEOL process changes and the BEOL lot grade being associated with one or more BEOL process changes.

18. The system according to claim 17, wherein the set of instructions, when executed by said CPU, causes said system to:
combine the FEOL lot grade and the BEOL lot grade based on data stored in the grading reference database.

19. The system according to claim 17, wherein the set of instructions, when executed by said CPU, causes said system to:
generate a join lot grade, the join lot grade including a combined lot grade of the FEOL lot grade and the BEOL lot grade.

* * * * *